United States Patent [19]

McNaney

[11] 4,097,122

[45] Jun. 27, 1978

[54] LIGHT OPTIC DATA HANDLING SYSTEM

[76] Inventor: Joseph T. McNaney, 8548 Boulder Dr., La Mesa, Calif. 92041

[21] Appl. No.: 753,735

[22] Filed: Dec. 23, 1976

[51] Int. Cl.² ............................................. G02F 1/34
[52] U.S. Cl. ..................................... 350/353; 350/359
[58] Field of Search .................... 350/160, 161; 332/7, 332/51; 340/173 R, 173 L, 173 M, 173 LS, 173 LT

[56] References Cited

U.S. PATENT DOCUMENTS

| 3,872,451 | 3/1975 | McNaney | 340/173 LM |
| 3,960,440 | 6/1976 | McNaney | 350/161 W |

Primary Examiner—William L. Sikes

[57] ABSTRACT

The system herein includes light optic means which functions as a light beam distributor in making available one or more of a plurality of input beams at any of a plurality of differently positioned output paths of the system as opposed to the more well known line scan beam deflection systems. The input source of light may be from one or more sources of radiant energy, each providing a different color of light, whereupon such energy is combined and directed along a common output path. Also, the system herein includes such optic means for converting a given cross sectional dimension of the one or more beams admitted thereto to a unitary, relatively smaller cross section, beam of radiant energy.

3 Claims, 7 Drawing Figures

4,097,122

LIGHT OPTIC DATA HANDLING SYSTEM

BACKGROUND OF THE INVENTION

The invention herein relates to light optic data handling systems which utilize the light beam distributor concept as set forth in a co-pending application Ser. No. 655,152 filed Feb. 4, 1976, now U.S. Pat. No. 4,004,847, and in a co-pending application Ser. No. 662,848 filed Mar. 1, 1976, now U.S. Pat. No. 4,032,220. However, regarding its usefullness, the improvement herein may be utilized as the input source of radiant energy to the light optic data handling systems improvements disclosed in U.S. Pat. Nos. 3,985,426; 3,985,428 and 3,988,055.

SUMMARY OF THE INVENTION

A beam of light, preferably from a laser source of light, but which can be in the form of radiant energy extending from ultraviolet, through the visible spectrum, to infrared, is directed along an input path of the system. Or, two or more such beams may be directed simultaneously along their individual paths to the system each representing, for example, a different color of light. Upon entering the system the beam, or beams, is directed along a path therein referred to as a primary optical path. In following this path a beam representative of the combined input undergoes a series of light reflections which allows the beam to spiral its way through a length dimension of the system so as to make available light thereof at one, or a number of, output positions of the system. From one or more controlled output positions light will be directed along a secondary path for utilization beyond the limits of the system. More importantly, an object of the invention is to utilize deflection control means within the system to effect the conversion of an otherwise large diameter input beam of light to much smaller diameter beams at proportionly higher densities. Light output from the system can be used in communications, color presentations, computer information display or recording, or for data control purposes in general. It is a further object of the invention to extend the resolution, deflection and light beam control capabilities beyond those within the present state of the art.

The invention is illustrated, by way of example only, in the accompanying drawings and the description which follows when read in connection with the drawings will provide a better understanding of the objectives and other advantages of the invention.

DESCRIPTION OF THE INVENTION

Figure 1:
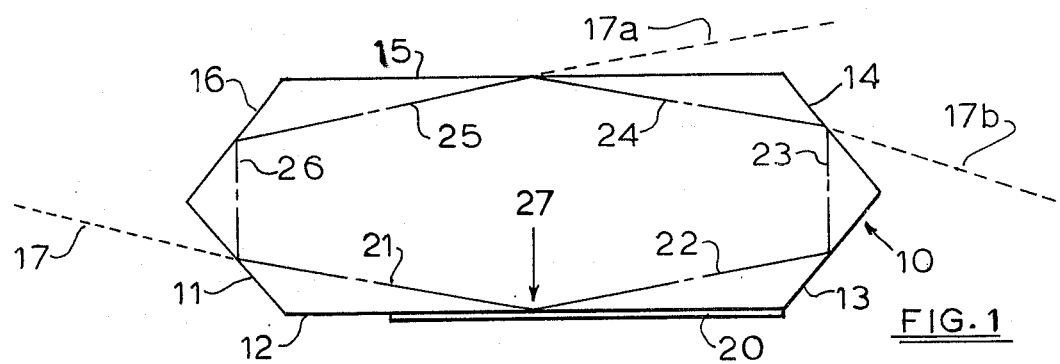
FIGS. 1 and 2 show first and second views, diagrammatically illustrated, of the light reflection control means of the system.
Figure 2:
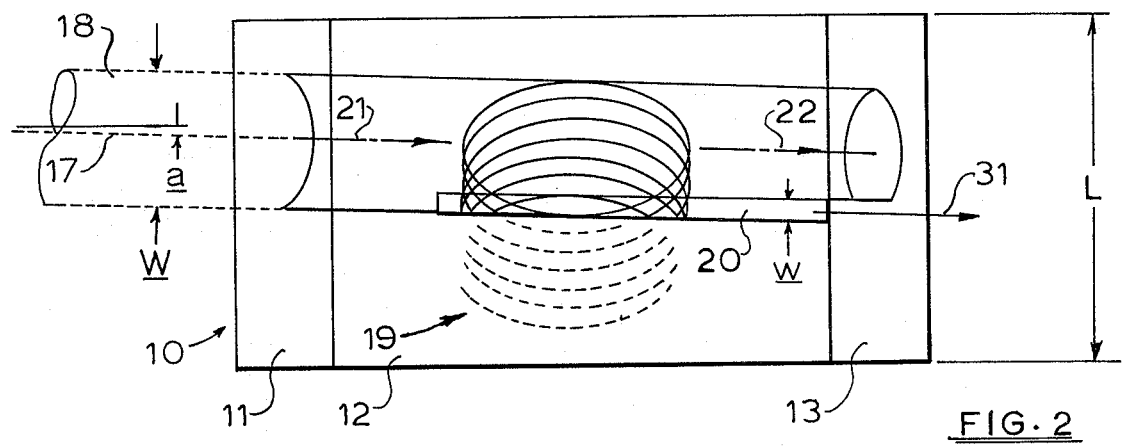

Referring to FIGS. 1 and 2, the partly schematic views of the invention are designed to show the main light reflector means of the system which will be referred to as light guide 10 and as having a length dimension L. It is also shown as representing a solid member 10, and is of a good light conducting material such as a glass or plastic material. Depending upon a manner of operation decided upon for the invention the material can be any of a number of piezoelectric effect, Kerr effect, Pockels effect or ferroelectric effect materials, either in the form of a solid, liquid, gas or colloidal state. Examples of certain materials may include quartz, tourmaline, barium titanate, lithium niobate, lithium tantalate, or like materials. However, all of these materials will be of particular interest insofar as the embodiment of FIGS. 4 through 7 are concerned.

The light guide 10 of FIGS. 1 and 2, which will be understood as being a good light conducting glass, is illustrated as having six light reflecting surfaces 11, 12, 13, 14, 15 and 16, each of which have been, of course, optically cut and polished. These surfaces are each angularly oriented so as to establish an optical relationship one with respect to the other for allowing a beam of light along an input bath 17 and incident upon surface 11 to be directed along a primary optical path within the guide 10 forming a helix of plural revolutions through the length dimension L of the guide 10. The helical path through the guide will be related to the angle $a$ of the path 17 of the beam entering the guide as indicated in FIG. 2, which is of course an exemplification as well as the greatly enlarged showings of all Figures in the drawings. Upon entering the guide from along path 17 through the surface 11 the beam of light 18 will be directed along a segment 21 of the primary path, then reflected at surface 12 to and along a segment 22 of the primary path, then reflected at surface 13 to and along a segment 23, then reflected at surface 14 to and along a segment 24, then reflected at surface 15 to and along a segment 25, then reflected at surface 16 to and along a segment 26, then reflected at the surface 11 to and along a second revolution of the primary path for the beam and thereby follow a helical path through the dimension L of the guide 10.

A light conducting member 20, representing a secondary light guide of the system, and having a predetermined index of refraction which is higher than that of the guide 10 material, is intimately joined to the surface 12 at a predetermined location along the length L of the guide 10, representative of the output control position of the system. At this position the member 20 functions as a light reflection control means for redirecting light away from the primary path and along a secondary path 31 in the form of light output of the system. The width dimension $w$ of the member 20 is a predetermined number of times smaller than the width dimension W, or diameter, of the beam of light 18. There is a direct relationship between the angle $a$ of the input path, the width W of the beam 18, and the width $w$ of the member 20. The angle $a$ establishes a primary path forming a helix of plural revolutions wherein the path of each revolution is spaced one from the other a distance equal to, or thereabout, to the width dimension $w$ of the member 20. In the present case the width W of the beam is illustrated as being seven times that of the member 20 width $w$. This will allow the beam 18, or different portions of its cross section W, to be incident upon the interface of the guide 10 and member 20 materials once during each of seven revolutions of the beam 18. A summation of the seven different portions therefore appear in the output beam along the secondary path 31.

Figure 3:
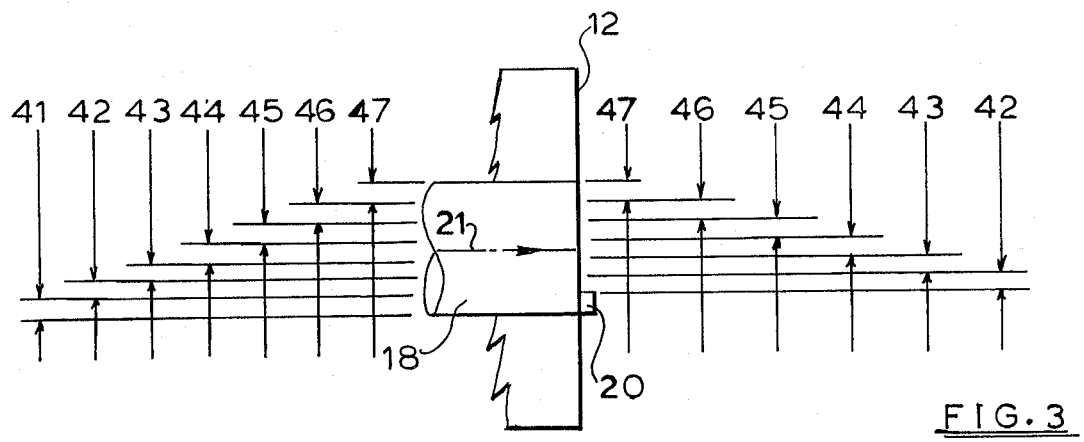
FIG. 3 is a section of FIG. 2 which will be referred to in describing the operation of the invention.
Figure 4:
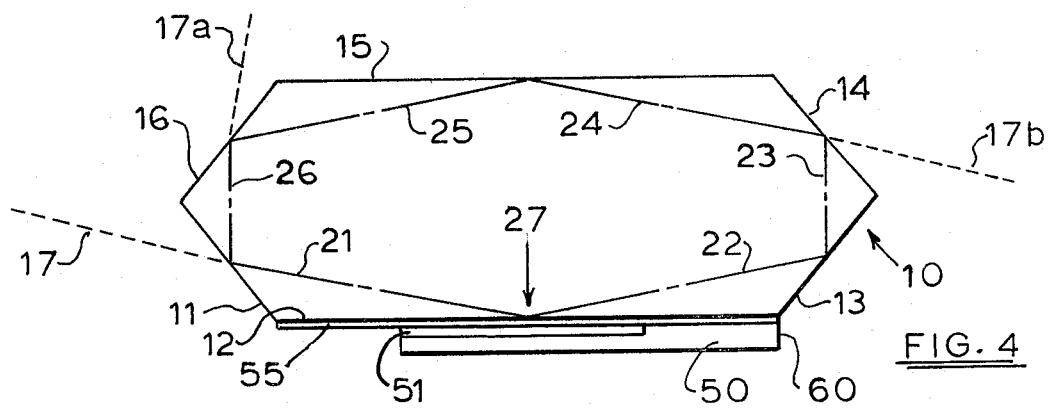
FIGS. 4 and 5 show first and second views, diagrammatically illustrated, of the light reflection control means of a further embodiment of the invention.

The above may be more fully understood with the aid of the diagram in FIG. 3, wherein the manner in which this takes place is illustrated. The seven portions of the beams cross section are identified as portions 41, 42, 43, 44, 45, 46 and 47. During the presence of beam 18 along the input path 17 portion 41 will be incident upon interface of member 20 and appear along the output path 31 simultaneously with the reflection of the remaining portions 42 through 47 from the surface 12, which will be the start of a following revolution. When these remaining portions again reach the surface 12 the portion 42 will be directed along the output path 31 simultaneously with the reflection of the remaining portions 43 through 47 from the surface 12, which will be the start of the next revolution. By the time the last portion 47 reaches the interface of the guide 10 and member 20 a summation of the seven portions will have been established for continued appearance along the output path 31, representing a totality of the light in the initial beam 18, reduced in its cross sectional dimensions by the dimensions of the member 20. The use of a relatively smaller width $w$ for the member 20 would permit still higher concentrations of the beam 18 radiant energy at the output of member 20. Examples of dimensions considered herein could include a beam 18 width $W$ of 0.035 inch reduced to 0.005 inch by a member 20 width $w$ of 0.005 inch. The thickness of the member can be 0.005 inch as well.

The means as set forth in the foregoing co-pending application Ser. No. 662,848, for establishing periodic variations of index of refraction of materials presenting a reflecting interface at the output control position, can be included herein to effect a modulating of the light along the output path 31. This will be discussed further in connection with the embodiment of FIGS. 4 to 7. However, such modulating of the light output will leave remaining in the system leftover portions of light 19 which will be reflected out the other end of the guide 10. Also, as disclosed in this copending application, additional light beams of different wavelengths can be directed into the system, for example, along input paths 17a, 17b, etc. Or additional radiant energy of the same wave length can be directed into the system in this manner.

Figure 5:
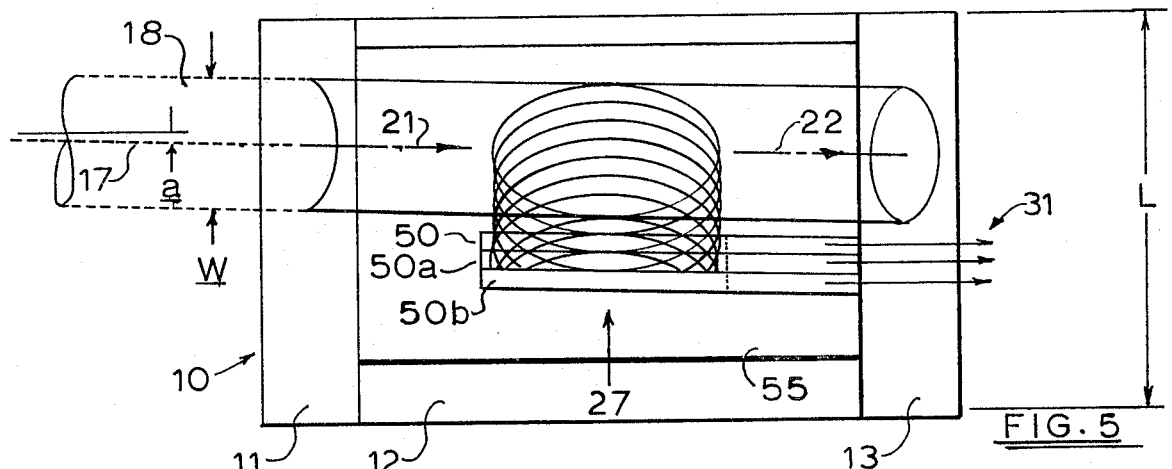
Figure 6:
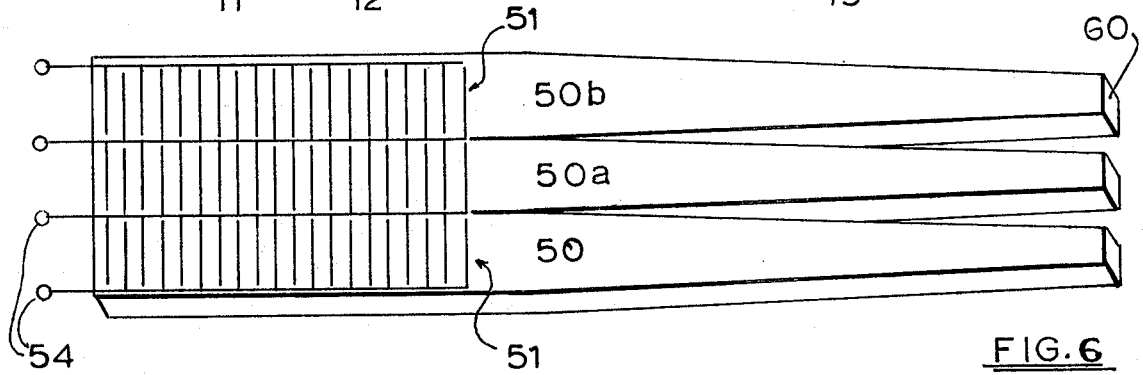
FIG. 6 is a greatly enlarged detail of light output control means of this embodiment.
Figure 7:
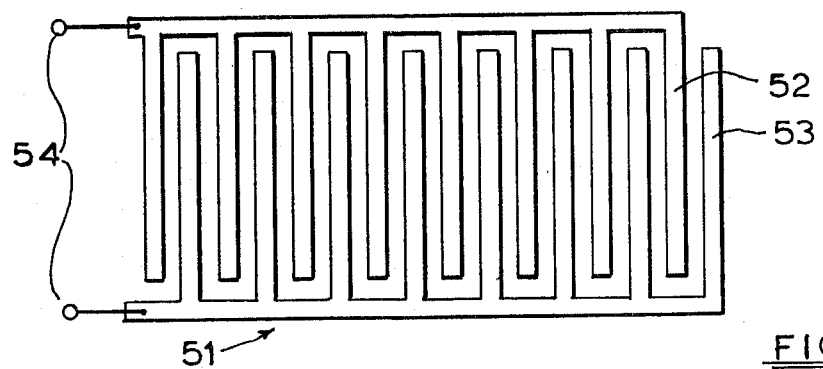
FIG. 7 represents an electrode assembly of this embodiment.

The embodiment of FIGS. 4 through 7 differs from the foregoing only to the extent that a number of light guides 50, 50a, 50b, etc. are included so as to provide a number of individually controlled light outputs extended along a line array of secondary paths 31. Associated with each of these secondary light guides, or members, 50, 50a, 50b, as shown in FIG. 6, there is an electrode assembly 51, each adjacent the output control position 27 of the system. One such assembly is shown in FIG. 7, and each include a number of first and second finger electrodes 52 and 53, provided with terminal means 54 to which electrical control potentials will be connected. The illustration of these assemblies in FIG. 6 is shown as they might be viewed from the opposite side of the guide 10. A layer of light conducting material 55, having a thickness of a micrometer, for example, is deposited on the surface 12 and is sandwiched between this surface and the assemblies 51 in the area of position 27, followed by the members 50.

In achieving the light reflection control objectives of the invention either the guide 10 material or the layer 55 material, or both, will be of a light conducting material exhibiting electrical field responsive characteristics whereby the presence of such a field produces a spatial modulation of the refractive index at the interface thereof so as to effect a diffraction grating to light incident thereon in the area of the output position 27. Such grating will allow light to be diffracted out of the guide 10 and into the secondary guide 50, or in the case of the first embodiment, into the secondary guide 20. The manner in which different portions of the beam 18 are combined in a selected one of the members 50 is the same as that described in connection with the initial embodiment of FIGS. 1 through 3. In FIG. 5 the various portions of the beam 18 have been illustrated to indicate that a voltage has been applied to terminals 54 of the assembly 51 adjacent the member 50a. This allows the beam to be deflected beyond the reflection control means of member 50. Each portion of the reflected beam is then frustrated at the member 50a position, admitted to this member and conducted along a corresponding output path 31. The greatly enlarged illustration of FIG. 6 is to show that the initial member 50 width of 0.005 inch may be slightly tapered so as to provide an output end 60 having a width of 0.003 inch. Member thickness may be 0.003 inch.

Depending upon the material requirements of a given application the layer 55 may, or may not, be of a Kerr effect, Pockels effect, piezoelectric effect, etc. material, in relation to a similar guide 10 material, it does in any case present a predetermined index of refraction which is lower than that of the guide 10 material index and lower than that of the member 50 material index. And in each event the layer 55 will serve to optically separate the electrode assemblies 51 material and the members 50 material from the guide 10 material.

It should be understood by those skilled in the arts pertaining to the construction and application possibilities of the invention herein set forth that the embodiments included herein illustrate in a very limited sense the usefulness of the invention, and that the invention includes other modifications and equivalents as they may be seen by those skilled in the arts, but still being within the scope of the appended claims. For example, although it is preferable to have a well columnated beam of light 18, since the drawings indicate this might be the case and representative of an ideal situation, this is not a requirement. Therefore, rays of light along the input path need not all be parallel with the center of the beam's optical path of each revolution, which would be the case when using a light emitting diode as the radiant energy source, for example. Depending upon the particular source of light utilized, therefore, some rays of light entering the system may not reach the member 20, or 50, so as to be collected thereby and directed along an output path 31.

I claim:

1. A light optic data handling system comprising:
    a. means for providing a beam of light;
    b. means for directing said beam of light along a primary optical path within said system including an array of light reflecting surfaces, each surface presenting a length dimension and each angularly oriented so as to establish an optical relationship one with respect to the other for allowing said beam to be directed along said path forming a helix of plural revolutions, the optical center of said beam of each revolution thereof displaced a predetermined distance one with respect to the other in a side-by-side relationship in the direction of said length dimension, said distance less than a cross sectional dimension of the beam in the direction of said length dimension so as to provide a multiple overlapping of light of said beam along said path and a reflecting of light, simultaneously, from different portions of said beam toward a light output position of said system.

2. The invention as set forth in claim 1 wherein said light beam providing means comprises first and second light sources providing a beam of light having first and second wavelengths, respectively.

3. The invention as set forth in claim 1 including light redirecting means at said output position for receiving light directed toward said position and effecting a combining of light from said different portions of the beam and a redirecting of said light along a secondary path stemming from said position to and beyond the light reflecting limits of said system.

* * * * *